March 24, 1970  W. H. COULTER ET AL  3,502,973
COLLATING APPARATUS FOR PAIRS OF ELECTRICAL PULSES PRODUCED
BY PARTICLE ANALYZING APPARATUS
Filed March 18, 1968  9 Sheets-Sheet 1
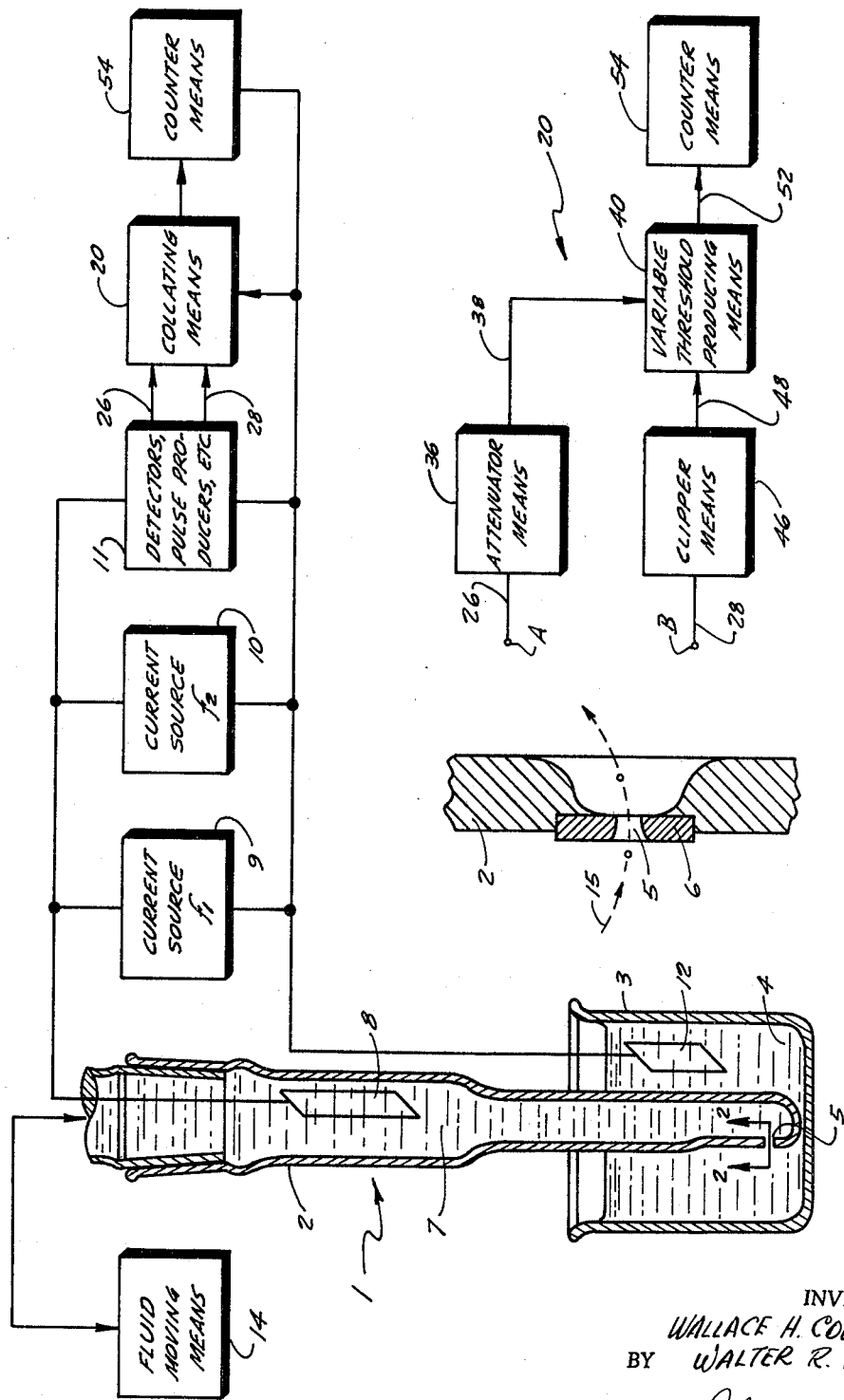
INVENTORS
WALLACE H. COULTER
BY  WALTER R. HOGG
Silverman + Cass
ATTORNEYS

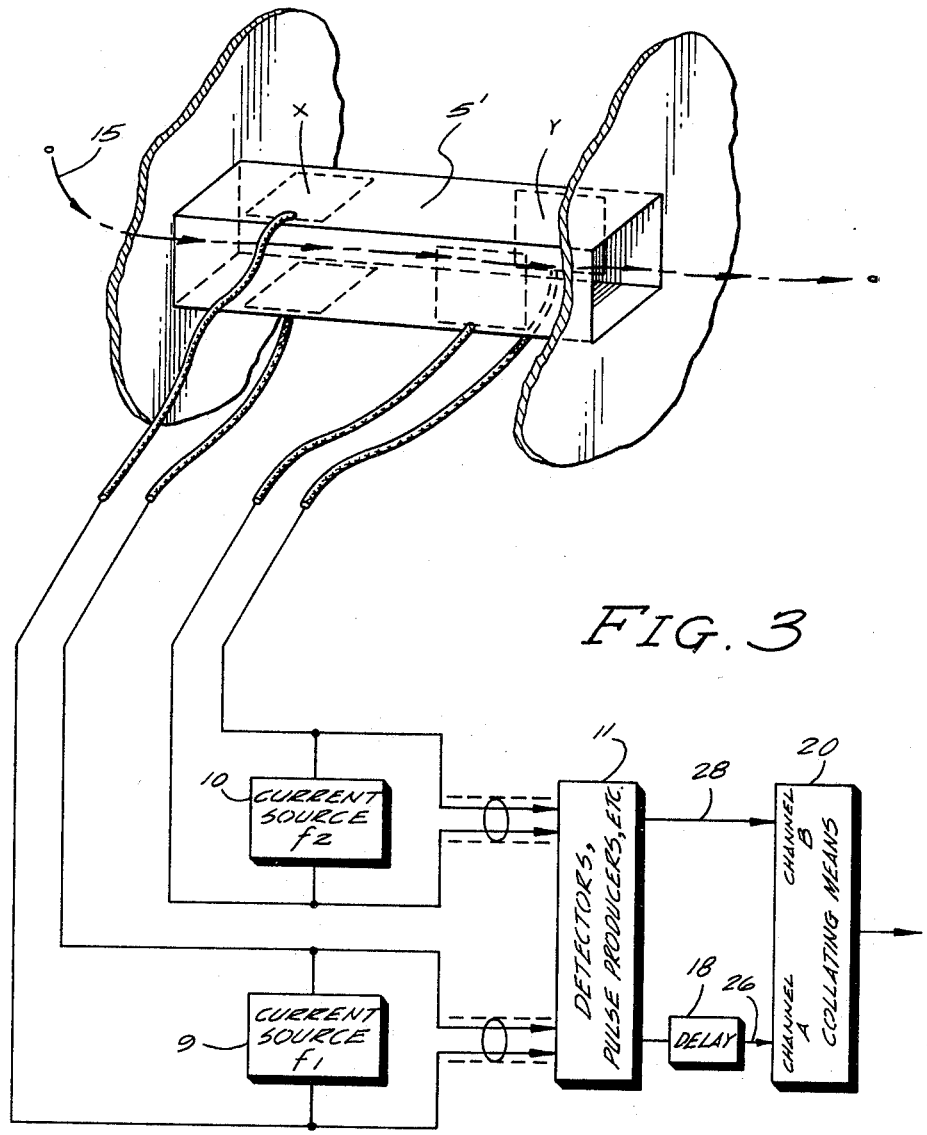

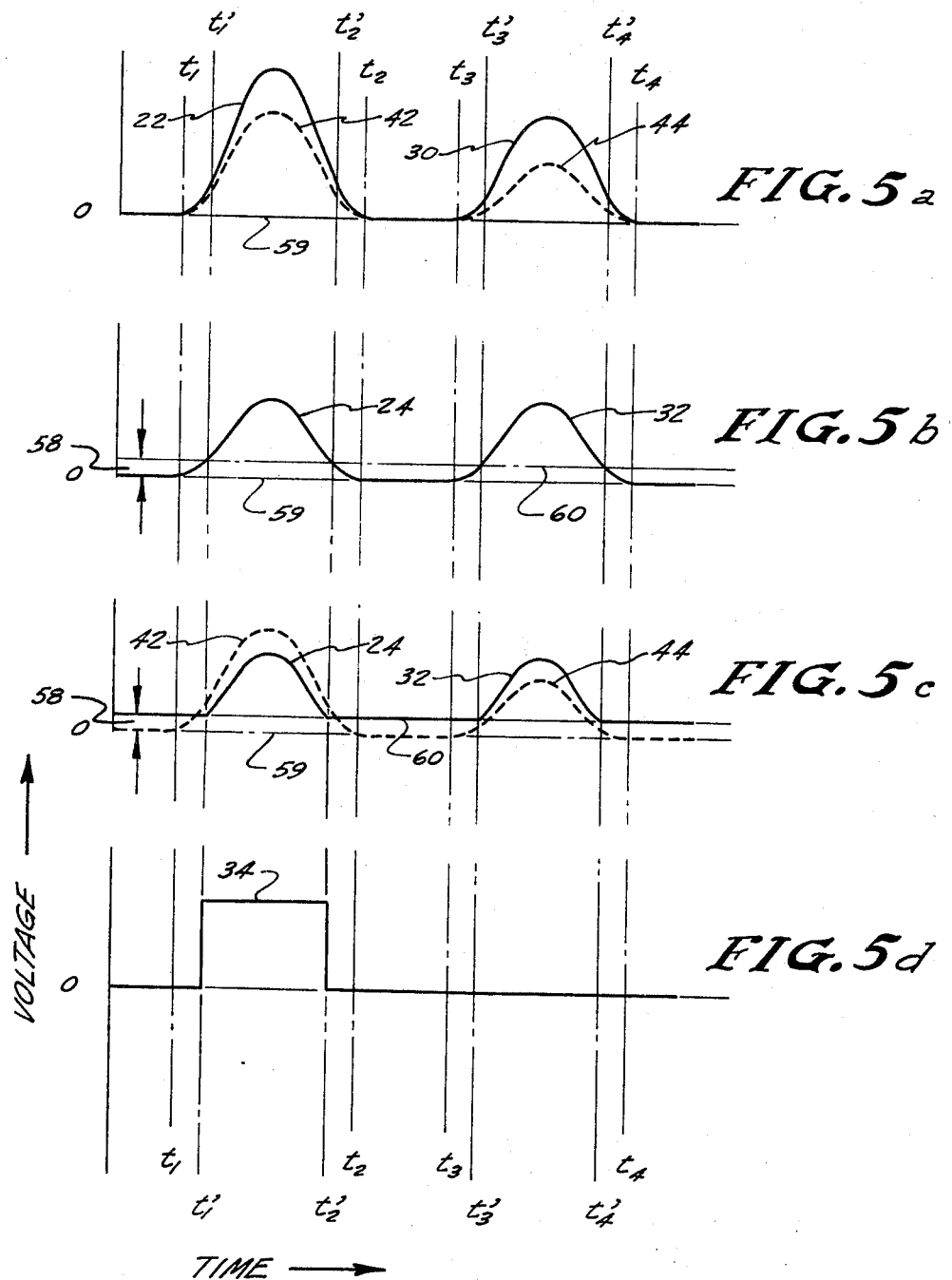

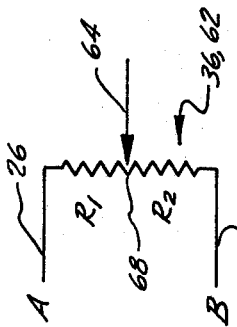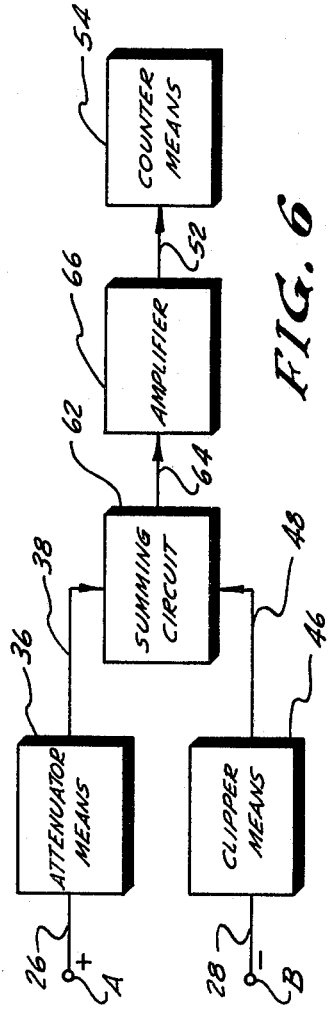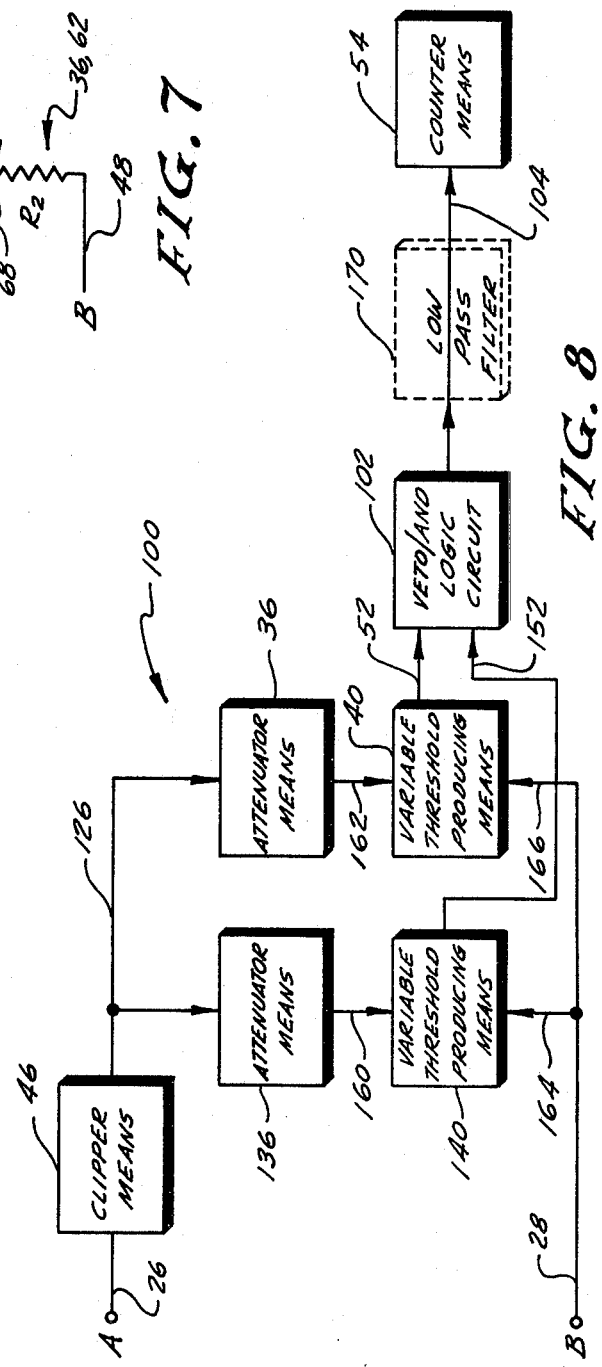

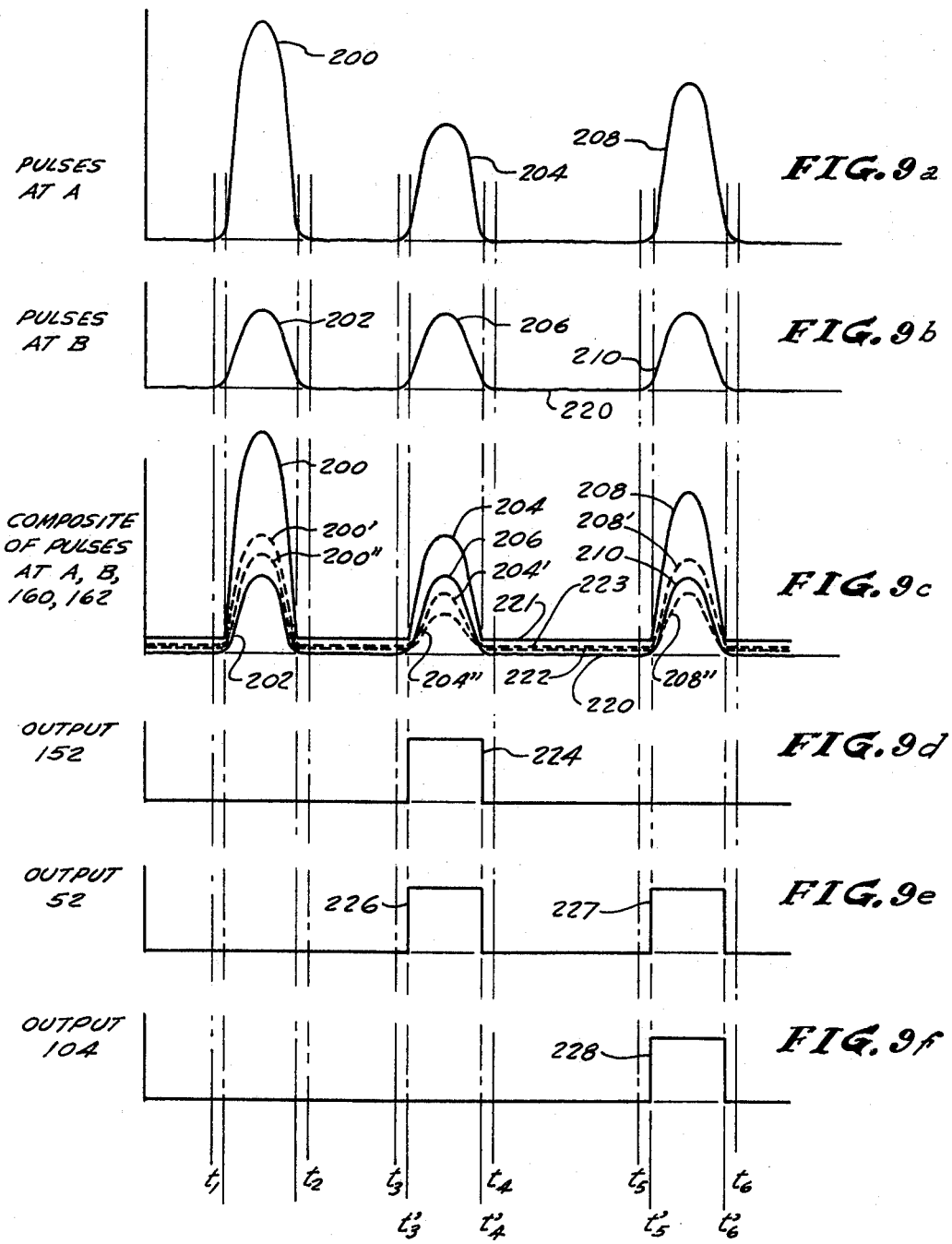

INVENTORS
WALLACE H. COULTER
WALTER R. HOGG
BY
Silverman & Cass
ATTORNEYS

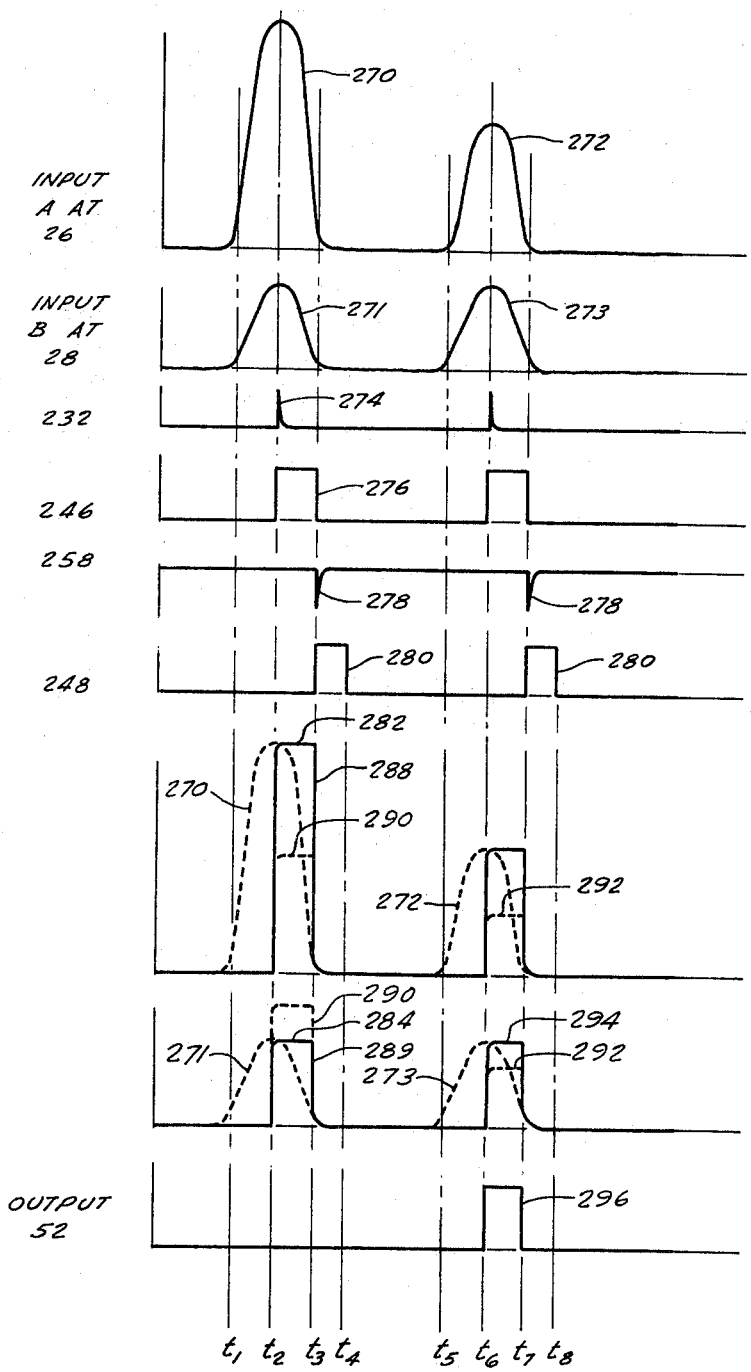

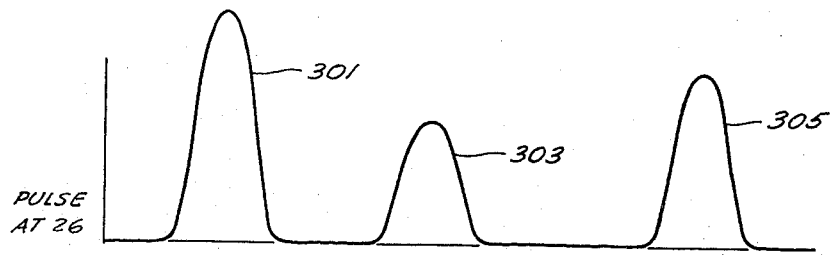
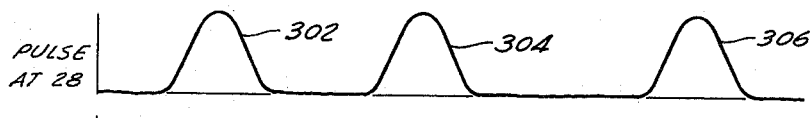
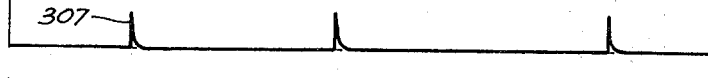
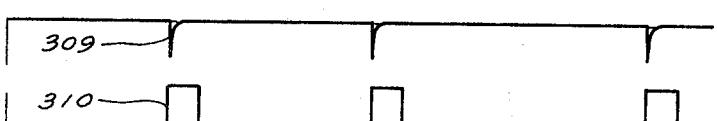
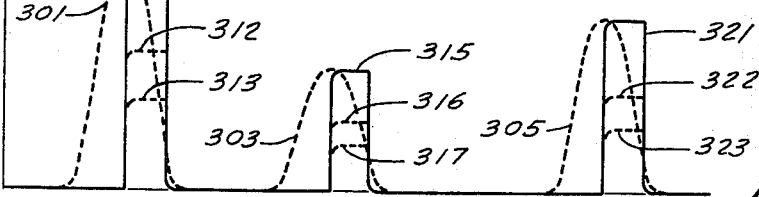
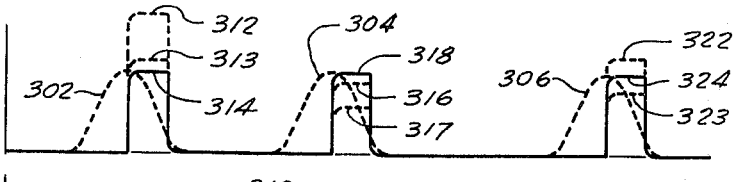
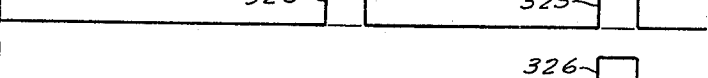
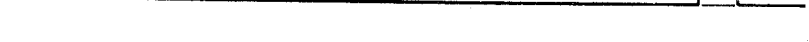

United States Patent Office 3,502,973
Patented Mar. 24, 1970

3,502,973
COLLATING APPARATUS FOR PAIRS OF ELECTRICAL PULSES PRODUCED BY PARTICLE ANALYZING APPARATUS
Wallace H. Coulter, Miami Springs, and Walter R. Hogg, Hialeah, Fla., assignors to Coulter Electronics, Inc., Hialeah, Fla., a corporation of Illinois
Continuation-in-part of application Ser. No. 552,232, May 23, 1966. This application Mar. 18, 1968, Ser. No. 713,968
Int. Cl. G06f 7/38; G01n 27/00
U.S. Cl. 324—71
10 Claims

ABSTRACT OF THE DISCLOSURE

Apparatus in which there are two channels for receiving trains of pulses from a prior particle analyzing device of the Coulter type, each pulse normally having a companion pulse produced in the particle analyzing device by the same particle, and means are provided for achieving a signal which represents the relationship between pulses. In several embodiments, one pulse is attenuated in accordance with a particular factor and then compared with the other in a threshold circuit, so that only pulses of a certain range will produce output signals. In other embodiments, electronic windows are formed by means of pairs of thresholds, and one signal of each pair is treated by attenuation in two attenuators to provide two signals defining a given range. Only relationships which fall within the range result in output signals.

RELATIONSHIP WITH OTHER APPLICATIONS

This application is a continuation-in-part of co-pending application Ser. No. 552,232, filed May 23, 1966, and entitled Apparatus For Particle Classification and Analysis.

The invention relates generally to apparatus for analyzing particle-produced electrical pulses, and more particularly is concerned with collating apparatus by means of which seriatim analysis of pulses simultaneously produced by a Coulter electronic particle analysis device may be accomplished.

In the field of particle study it is often important to ascertain the relationship between two pulses of different amplitudes which are respectively produced simultaneously in two channels, this collation required to be accomplished in a relatively short time so as to enable measurement to be made of the next pair of pulses. In other words, where some apparatus produced two trains of pulses, paired substantially time-wise, it is required to collate each pair as produced.

The principal object of the invention is to provide apparatus of this type.

The particles which are of interest comprise biological particles such as blood cells, bacteria and the like; and microscopic particles found in industry including powders, slurries, dusts, emulsions and the like. Such particles are capable of being counted and sized by known apparatus which uses a principle that depends upon the passage of a particle in suspension through an electrical sensing zone of such dimensions that the presence of a particle will change significantly the impedance of the zone. This change in impedance is utilized to produce an electrical pulse, the duration of which is the time that the particle requires in passing through the sensing zone, and the amplitude of which is proportional to the volume of the particle.

The principle described above is known as the "Coulter principle" and particle analyzing apparatus utilizing this principle is described and claimed in U.S. Patent 2,656,508 issued, Oct. 20, 1953 to Wallace H. Coulter, one of the applicants herein. Many devices embodying this principle have been placed in use commercially throughout the world.

It is feasible, and structures have been devised, as disclosed in the above-mentioned co-pending application, to generate more than one signal for each particle passing relative to the sensing zone, such signals being produced simultaneously or very nearly simultaneously and being separable on the basis of frequency and/or phase relationships, to enable their processing in independent channels. The relative and absolute magnitudes of these several signals constitute their "signatures" by means of which the particles producing such signals may be identified by kind as well as by size.

It will be appreciated that in a Coulter apparatus the rate at which particles pass relative to the sensing zone is quite high. A typical commercial device used in a biological laboratory processing a diluted sample of blood for example, could be counting and sizing cells at rates exceeding a thousand per second. Even higher Coulter apparatus rates are not unusual in medicine and biology as well as in industry. If each particle passing relative to the sensing zone produces a pair of different pulses, in order to analyze these pulses and collate them one relative to the other, the operations performed on each pair must be started and completed before the next pair occurs, and the information thereby produced must be stored or displayed or otherwise utilized without stopping the operation, either of the particle analyzing apparatus or the collating means.

The invention contemplates apparatus which can accomplish these ends.

According to the invention two electrical pulses are produced by a common particle moving relative to the sensing means. Such sensing means may comprise an aperture in an insulated wall having a particulate system suspended in electrolyte passing through the aperture. Simultaneously an electric current flows through the aperture, the current being generated by two or more sources connected across electrodes suspended in fluid bodies on opposite sides of the wall. These sources could be one D.C. and one R.F.; two R.F.; one D.C. and two R.F.; etc. The sensing means may have two zones or parts with one source providing current for each part, so that each pulse produces two electrical pulses separate slightly time-wise, instead of simultaneously. In this case the electrical pulses are readily brought into timed coincidence by suitable delay means in the circuit so that the collation may occur simultaneously with simple circuitry.

Reference made hereinafter to "commonly produced" pulses is intended to mean that the pair of pulses has been produced by a common particle moving relative to one or two sensing zones so that there may be a slight time difference between their occurrence.

One of the simplest collations which would be of value is to make a comparison between the pulses of a commonly produced pair and evolve therefrom an output signal only if the comparison indicates a certain relationship, thereby discarding all others. The relationship is determined in advance and is based upon the worker's interest in certain particles and absence of interest in others. Since particles may be caused to produce simultaneous or closely occurring pulses of different amplitudes depending upon the materials and construction of the particles, it is not difficult to ascertain what the pulse relationship of the commonly produced pairs should be in order to meet the specifications of the analysis. For example, if the pulse amplitudes are in the range between 2 to 1 and 3 to 1 they might represent particles of a substance in which there is interest, while if the amplitudes of pairs of commonly produced pulses have a relationship other than falling in that range of 2 to 1 and 3 to 1 they would represent pulses in which there is no interest. The apparatus could be set up to count all pulses falling within the desired range and discard all outside of the range, so that the data obtained is related only to the desired kind of particles.

The simplified apparatus constructed in accordance with the invention collates the signals of a commonly produced pair, evolving a single signal or pulse only if the conditions of the collation are met. For example two possible signals might be generated by the simultaneous application to the sensing zone of a direct current or one of very low frequency and a current of radio frequency. There would be derived a pulse attributable to the direct current or low frequency source, which pulse would be proportional to the volume of a particle; whereas, there would also be a commonly produced signal attributable to the radio frequency source, which signal would be proportional to particle volume and to the "opacity" of the particle as well. The use of the word "opacity" here is intended to signify the characteristic of the particle due to the substance from which it is made on the basis of which high frequency current may or may not pass through the particle. On this basis, some particles may also be made of substances which are more "transparent" to flow of high frequency current than others, and/or their shells and interiors may affect such "transparency." It is understood that light transmission or absence thereof are not involved in the use of either of the expressions, "transparency" or "opacity."

Continuing with the example, if the radio frequency is chosen such that the signal attributable to it is one half of the signal due to the low frequency for a particle of a certain type or substance, due to the fact that the radio frequency current can penetrate the particle during passage of such particle relative to the sensing zone, such penetration serving to reduce the effectiveness of the electrolyte displacement, the derived signal would have an amplitude one half of the pulse attributable to the direct or low frequency source irrespective of the size of the particle. Recall that the operation of Coulter apparatus of the earlier types is based upon the particle displacing its own volume of electrolyte in the sensing zone and thereby substituting itself in the equivalent network representing the impedance elements of the zone.

Accordingly, for the hypothetical case described above, if the amplitude of one pulse divided by that of the other, that is to say—the amplitude of the radio frequency current caused pulse divided by the amplitude of the direct current caused pulse is substantially equal to one half, one may be fairly certain that the particle which caused both signals is of the type which is under study. It has been determined that particles of different type, that is, different physical charatcer or substance, are unlikely to have the same opacity to a given radio frequency current. If this quotient is radically different from one half, one may be fairly certain that the particle causing both signals of the pair is not of the type in which there is an interest.

Thus, of the several approaches to the problem of combining a plurality of pulses to obtain one pulse which is more directly meaningful to a user of the equipment, for example, by addition, subtraction, multiplication, or division, probably the most useful is by division. In order to ascertain that one pulse has an amplitude of one-half that of antoher, as in the above example, division is implied. It is an object of this invention to provide apparatus which will perform this operation as each pair of pulses occurs, quickly enough so that the operation is completed before the next particle produces a new pair of pulses.

The invention contemplates two different structures for producing information relating to the quotient of one pulse amplitude divided by the other. In one structure, a signal is obtained following the operation performed by the collating means which is produced only if the ratio falls within a certain predetermined range. This signal is a pulse of some convenient amplitude, and obviously it is capable of being counting or otherwise used on the basis that it represents a particle falling within the range, all others being discarded.

An improtant object of this invention is to provide apparatus performing the operation of division through the use of relatively simple circuitry, the apparatus being arranged either to select information obtained from the results of the division or to furnish the information continuously.

In the practice of the invention, as previously mentioned, it is important that the operation of collating the amplitudes of the two signals be performed quickly, because the pulse producing apparatus is furnishing strings of pulses, paired time-wise, but not following any pattern in consecutive occurrence. The collation is thus required to be done independently for each pair of pulses, and this must occur seriatim, that is, one determination after another. This differs from known techniques in which pulses are accumulated and integrated, averaged, and so on. Such known techniques do not require fast response characteristics for their circuitry.

Accordingly the invention has an important object the provision of collating apparatus which is extremely fast-acting so as to enable a large number of determinations to be made independently and seriatim, without the need for using averaging or accumulating of signals.

In passing it may be noted that the apparatus of the invention which provides the dividing function is direct operating as opposed to indirect operating apparatus utilized in some prior art computer circuitry.

The invention has many additional objects as well as producing advantages which will be brought out by the description which follows. Such advantages and benefits attach to Coulter systems in which pairs of pulses are generated simultaneously or substantially so, and continuously on respectively different channels and it is desired to obtain data on the relationship between these pulses as they occur.

The drawings which are attached hereto are, for the most part, diagrammatic in nature since the invention is explained in addition to the specification which follows by means of charts, symbols and block diagrams. This is done with a view toward presenting the invention in a manner to enable those skilled in this field to appreciate and understand the advance in the arts and sciences represented by the invention and all of its ramifications. Those persons so skilled will be fully aware of the electronic circuitry represented by the block diagrams without the need for further detail, since the individual components for the most part represent well-known and accepted circuits used in other and related fields. The objects of the invention are achieved by the use of such components in a novel manner and in combinations not believed known or taught by others. As required by the patent laws, the apparatus described in detail hereinafter and illustrated in the drawings comprise preferred embodiments and examples and are capable of wide variation in their arrangements and parts. These examples may be constructed as independent devices energized by Coulter apparatus or may be incorporated into Coulter apparatus as accessories or adjuncts therefor.

In the drawings:

FIG. 1 is a diagrammatic view of apparatus constructed in accordance with the invention, combined with a Coulter particle analyzing apparatus which provides a pair of companion pulses for each particle sensed.

FIG. 2 is a sectional view taken generally along the line 2—2 of FIG. 1 through the aperture tube, on a greatly enlarged and exaggerated scale.

FIG. 3 is a diagrammatic view of a somewhat modified form of the invention including a sectional view through an aperture structure providing pulses separated in time, although derived from a common particle.

FIG. 4 is a block diagram of a simplified "single threshold" collating apparatus constructed in accordance with the invention.

FIGS. 5a to 5d are charts illustrating the wave shapes of pulses occurring in the structure of FIG. 4 all on the same time axis.

FIG. 6 is a block diagram of another simplified "single threshold" collating apparatus constructed in accordance with the invention.

FIG. 7 is a fragmentary circuit diagram of a combined attenuating means and summing circuit as utilized in the structure of FIG. 6.

FIG. 8 is a block diagram of a simplified "two threshold" apparatus constructed in accordance with the invention.

FIGS. 9a to 9f are charts illustrating the wave shapes of pulses occurring in the structure of FIG. 8, all on the same time axis.

FIGS. 11a to 11i are charts illustrating the wave shapes of pulses occurring in the structure of FIG. 10, all on the same time axis.

FIGS. 13a to 13b are charts illustrating the wave shapes of pulses occurring in the structure of FIG. 12 all on the same time axis.

Figure 10:
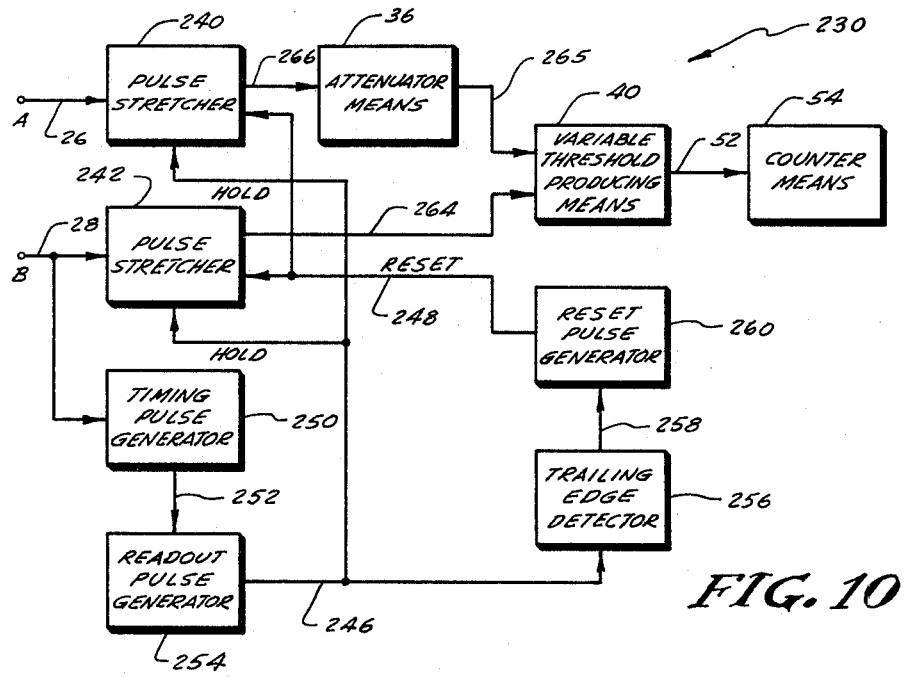
FIG. 10 is a block diagram of a "single threshold" apparatus of modified form constructed in accordance with the invention.

The invention herein comprises apparatus which utilizes pairs of pulses obtained from a particle analyzing device, these pulses being produced by a common particle moving relative to the sensing zone or zones of the analyzing device. The particle analyzing device includes means for detecting the pulses, separating them into different channels and the resulting channels thus have pairs of pulses occurring substantially at the same time, each pair representing information about a single particle. By multiplying the components of the apparatus, more than two pulses may be produced, as for example, if the current source means has more than two frequencies. Multiple channels can be built and permutated for obtaining more information. For convenience and ease of understanding, the discussion herein is directed to apparatus using only two channels, but obviously the invention is not so to be limited. One multiple channel device is described.

In FIG. 1 there is illustrated apparatus which includes the structure disclosed in said co-pending application. The Coulter particle analyzing apparatus is designated generally by the reference character 1 and comprises an aperture tube 2, a vessel 3, with the lower tube end immersed in the vessel in a body of fluid 4 carrying particles in suspension in an electrolyte. The tube end has an aperture 5 therein formed in the sapphire wafer 6, this being set into a wall of the tube 2. The body of fluid 7 on the interior of the tube 2 has an electrode 8 suspended therein, the electrode 8 being connected to the current source means 9 and 10, and to the apparatus 11. This latter apparatus is designated generally as a block marked Detectors, Pulse Producers, etc., and the details thereof are disclosed in the said co-pending application. The common electrode 12 is suspended in the body of fluid 4 and connected to the current source means 9 and 10, the detector means 11, the collating means 20 and the counter means 54. The two channels extending from the detector means 11 to the collating means 20 are designated 26 and 28.

Fluid is caused to move through the aperture 5 as indicated by the broken line path of FIG. 2 carrying the particles with such fluid by reason of the fluid moving means 14 that is connected pressure-wise with the interior of the aperture tube 2. The fluid moving means 14 may conveniently comprise the manometer-syphon scanning arrangement of U.S. Patent 2,869,078. The aperture tube 2 with sapphire wafer 6 is disclosed in U.S. Patent 2,985,830 and a method of making the same is disclosed in U.S. Patent 3,122,431.

The current source means 9 may be a direct current source, designated $f_1$, and suitable blocking elements may be used to assure that no problems arise in connection with the other current supply means 10, which may be an R.F. source designated $f_2$. Each time that a particle passes through the sensing zone means which is in the aperture 5, there will be a change in the impedance of the sensing zone. A typical path for such a particle is designated 15 in FIG. 2. Accordingly there will be a component of the change which will be attributable to each frequency, as explained in the co-pending application. These components are separated in the detector means 11 and electrical pulses are produced in the output channels 26 and 28 which have the respective amplitudes depending upon the effect caused by the particle at the particular frequency. Reference to frequency is not intended to exclude direct current as one of the sources, since its frequency is either zero or very low.

As will be obvious, the two electrical pulses caused by the common particle in the structure described will occur simultaneously. In FIG. 3 a form of aperture is illustrated in which there are two sensing zones spaced apart. Such an aperture might be fabricated in practice by embedding two wires in a sheet of insulating material while plastic, crossing each other at right angles and displaced from each other by several wire diameters, and after hardening of the insulating material, drilling a perpendicular hole through the insulating material and through both wires, such that the cut ends of the wires become the electrode surfaces. It is shown rectangular in cross section and made up of plane surfaces in order to make the illustration more easily understandable; it will be quite apparent to those skilled in the art that the cylindrical or any other configuration will yield equivalent operation. Such configurations would be useful in decreasing the amount of "crossstalk" between frequency channels, especially with the axes of the electrodes mutually perpendicular as shown, and relieving the associated electronics of some of the burden of separation which it would otherwise have to bear.

When a particle moves along the path 15 through the aperture 5' there will be a first electrical change in the region $x$ and a second change in the region $y$, so that the resulting electrical pulses will occur at different times. Our suitable circuitry, such as for example the delay circuit 18, which might be a simple delay line, the earlier pulse may be delayed a sufficient time to cause the output pulses on the channels 26 and 28 to occur simultaneously. Alternatively, the pulse stretchers in some of the electronic circuits to be described later could be adjusted to hold the earlier pulse information until the occurrence of the later pulse, as needed.

The novelty of the invention herein is embodied in the structures represented by the block 20 and combinations of the apparatus of the block with other apparatus.

The structure of the invention is characterized by the provision of means which are capable of receiving pulses of a pair commonly produced, and evolving an output signal if the quotient of the input pulses satisfies preset conditions. Such means must also be capable of performing this operation quickly, recovering between pairs of pulses which are arriving at a very high rate so as to be capable of performing its function seriatim. They are classified as single and multiple threshold devices, depending upon the control of the output of the apparatus through the use of threshold circuitry.

In FIG. 4 there is illustrated a highly simplified block diagram of a single threshold circuit collating apparatus 20 constructed in accordance with the invention. As used hereinafter the word "threshold" is intended to have a meaning signifying a voltage level or value, not necessarily fixed or constant, against which some other voltage not necessarily fixed or constant is measured or with which it is compared. Thus when the word is used alone, it shall be intended to refer to the level or contour established in the referred-to threshold circuit. In the first aspect of the invention, the thresholds will be contours principally established by the pulse received on one channel.

In FIG. 4 the two input terminals A and B extend to two output channels from the detector means 11 in which there are two pulses produced in the two output channels 26 and 28 from each particle moving relative to the sensing zone means. For the sake of the explanation, the channel connected with terminal A is assumed to have the larger pulses appearing thereat, these normally being attributable to the changes resulting in the impedance of the sensing zone due to the passage of particles in which there is a direct current flowing in the zone. The pulses appearing at B may be assumed attributable to a radio frequency source current, these pulses being of lesser amplitude. This assumption is not to be considered limiting.

In FIGS. 5a to 5d, charts of the various wave shapes of the pulses of FIG. 4 are shown. The incoming pulses are shown in the charts FIG. 5a and FIG. 5b. These two signals are those appearing at the terminals A and B, respectively. Thus, one pair of companion pulses 22 and 24 occurring at the same time appear respectively at the lines 26 and 28. These pulses would have been caused by a single particle moving relative to a sensing zone, or relative to two parts of sensing zone means. The amplitude of the pulse 22 is about twice the amplitude of its companion pulse 24. The duration of the pulses 22 and 24 is from $t1$ to $t2$.

At another later time, from $t3$ to $t4$, another pair of commonly produced companion pulses 30 and 32 occur at the respective lines 26 and 28, but in this case the amplitude of the pulse 30 is only about one-third greater than the amplitude of its companion pulse 32.

Now in this apparatus 20 it is assumed that the only type of particles in which there is an interest are those particles in which the pulse on the B channel is smaller than the companion pulse on the A channel by a certain factor, which is adjustable. In the structure shown, this factor has been chosen to be two-thirds, that is, unless the A signal is greater than three halves the B signal, there will be no output as a result of the pair of pulses. If the apparatus can perform this function, it is simply dividing the one by the factor and comparing the result with the other, referring of course to their amplitudes. In FIG. 5, it will be noted that where the pulse on the A channel is twice that on the B channel there is an output pulse 34 at 5d of the chart, but where the relation is only 4 to 3, there is no output. The required relation in this case is the limiting value of the A pulse to produce an output. Since it has been assumed that the B pulse cannot be greater than two-thirds of the A pulse in order to produce an output signal, any time the quotient of A divided by B is less than 1.5, there will be no output signal. Obviously if the quotient is greater than 1.5 there will be a signal.

This may be expressed as a division of one by the other:

$$(1) \qquad \frac{P_A}{P_B} = \frac{3}{2}$$

or, the ratio of the amplitude of the pulse A to the pulse B must always be greater than 3/2 to produce an output pulse, $P_A$ and $P_B$ being the pulse amplitudes.

In the apparatus 20, the signal at 26 is applied to a simple attenuator 36 which does the dividing. This can be a potentiometer reducing the signal from 26 to 38 by one-third, with an adjustment to enable change of the factor, which may be referred to as F. Obviously the attenuation is such that the output is 2/3 the input. The factor F in FIG. 4 is 3/2 as stated, but could be any value. For example, if the attenuator 36 does not change the signal, the factor F will be one, which means that unless the ratio of the A pulse to the B pulse is greater than 1 there will be no output signal. In this latter case companion pulses of about the same amplitude will produce output pulses. When the B pulse drops in amplitude below that of the A pulse, there will be no output signal.

In FIG. 5, after the attenuator 36 has reduced the amplitude of the signal at 26, its output will be shown in broken lines. Thus, in FIG. 4, this output appears at 38 and is applied to the variable threshold producing means 40. Assuming the factor of 3/2, the amplitude of the pulse 22 and the pulse 30 are both reduced by one-third, resulting in the pulses 42 and 44. The pulses 42 and 44 are shown on the same base line 59 of the chart 5a as used to show the input pulses 22 and 30 so that a comparison may be made. The same pulses 42 and 44 are shown in chart 5c but the base line of these pulses is not the same as the base line of the pulses with which the comparison is being made. This will be discussed shortly.

According to the invention, in the structure of the type being described, the threshold which must be exceeded by the pulses which appear on one channel in every case will be established by the companion pulse appearing simultaneously on the other channel. In FIG. 4, the signals appearing at the terminal B appear on the line 28 and are applied through a clipper means 46 by way of a connection 48 to the threshold circuit 40. This latter circuit establishes a variable threshold which follows the pulse 24. Accordingly, when the signal from 38 is applied to the threshold circuit 40, unless the signal exceeds the threshold there will be no output at 52. If the pulse does exceed the variable threshold, then for all time that this occurs there will be an output, and this may be in the form of a saturated pulse 34 as shown. From this point, the pulses may be counted in a suitable circuit or counter means 54.

A practical circuit will have some structure to prevent the occurrence of false signals due to random noise in the A channel exceeding the level determined by the B channel noise. Thus, the clipper means 46 raises the base line 59 for the pulses 24 and 32 in the B channel by a slight amount indicated at 58 and when the pulses appear at 48 they are clipped along their bottom edges so as not to drop to the same baseline as before. The chart 5c shows this new base line as 60 but with the pulses from the A channel still related to the base line 59. Accordingly any signals at 38 must exceed the voltage 58 in any event in order to produce an output pulse, irrespective of their amplitude relationship with the companion pulses in the B channel.

As seen in the chart FIG. 5c, the pulse 42 will exceed in amplitude the pulse 24 between the times $t1'$ and $t2'$, and hence, according to the description above, there will be an equivalent output during this time as shown in chart FIG. 5d. As for the signal at 44, it is less than the amplitude of the signal 32 at all times, and hence there will not be an output at 52.

We may define the A and B pulses in accordance with their function in the collating apparatus 20. In this case we may refer to the A pulse as the measured pulse or signal, since it is attenuated to enable it to be used. The B pulse may be referred to as the reference signal since it provides the standard or control against which the A signal is measured.

From a practical consideration of the apparatus 20, there is a certain amount of random noise always superimposed upon the signals, which will cause false signals in the output, irrespective of the use of a clipper such as at 46. This clipper is to prevent the occurrence of pulses at the output due to noise between pulses. The problem arises because the noise superimposed upon all pulses makes the amplitudes and shapes of nearly equal pulses uncertain and may permit several threshold crossings during a single pulse pair. The noise could very well cause the apparatus to produce a multiple signal output for each pulse as the noise moves above and below the threshold.

If the threshold circuit 40 were a Schmidt Trigger circuit which has a type of response that includes hysteresis, one could adjust this hysteresis characteristic so that the voltage due to the hysteresis on the return of the pulse is greater than the peak to peak swing due to noise. Then when the composite pulse of the desired signal and noise has once crossed the threshold on the leading edge of the signal pulse, the noise cannot trigger off the threshold circuit until at least the signal pulse minus a peak in the noise once again falls below the threshold level. This need not be permitted to occur until the time of the trailing edge of the pulse as desired. Clearly the adjustment should take into consideration the maximum excursions of the noise. While this type of arrangement does not necessarily prevent noise from producing an output signal which would not be produced otherwise, it practically assures that there will be only one signal for each pulse that is close to the threshold.

Instead of a variable threshold producing means, such as shown at 40, one could use a simple differential amplifier whose output will be a pulse each time the difference between the input pulses has a chosen polarity. If the amplifier has sufficient gain, the magnitude of this difference may be made very small. Such an amplifier would be located in the diagram of FIG. 4 at 40, and its characteristics might be adjusted to provide an output only when the signals at 38 respectively exceed their companion signals at 48. If one signal is inverted by any suitable means, the companion pulses may be summed in a suitable network 62 as shown in FIG. 6 and the difference pulses at 64 applied to an amplifier 66 which drives the counter means 54. The amplifier 66 may be biased to discard any negative-going pulses sinch this would mean that the pulse at 48 exceeds the amplitude of its companion pulse, the pair thus representing signals from a particle which is not of interest.

A simple form of combined attenuator and summing network is shown in FIG. 7. It is a voltage divider connected across the lines 26 and 48, formed of a resistor R1 and a resistor R2 in series, the junction point 68 being a movable tap. The signals at A and B being of opposite polarity, the voltages will have opposing effects, just as in a bridge, and the voltage at the tap point 68 will be $$\frac{e_1 R_2 - e_2 R_1}{R_1 + R_2}$$

where $e_1$ and $e_2$ are the absolute values of the voltages at the paths 26 and 48, respectively. If the two terms in the numerator are equal, there will be no output. This can be true only if $$\frac{e_1}{e_2} = \frac{R_1}{R_2}$$

If the two terms are not equal, the output will be positive or negative depending upon which of the input voltages is greater. Since the ratio of resistances is constant once set, whether the output voltage at 64 is positive or negative depends upon which of the voltages $e_1$ and $e_2$ is greater than that which results in zero output. Thus, if the amplifier 66 is biased to accept only signals of a single polarity, the circuit has an output if the ratio of the input voltages exceeds the ratio of the resistors and has no output if the reverse is true, as is desired. The use of a movable tap 68 causes the circuit of FIG. 7 to function as both the summing network 62 and the attenuator means 36. If the resistors $R_1$ and $R_2$ have a fixed relationship, for instance if they are permanently equal, the attenuator means 36 may be used in the same manner as in FIG. 4 and the critical situation will be when the signal voltages at 38 and 48 are numerically equal. Obviously reference to a common ground must be considered in such a network, this not being shown in the simplified circuit of FIG. 7.

The use of the expressions "measured" and "control" applied to the respective signals is not to be considered limiting. Instead of having attenuation in the channel which provides the "measured" signal, it could be in the "control" or "reference" channel. The expression "control" or "reference" channel will simply mean here that channel whose signal must be exceeded by that of the other channel in order to produce an output at such a point as path 52 of FIG. 4. The "control" channel controls the threshold level which must be exceeded by the other signal in order to produce an output signal. The clipper means 46 is always in this channel since its function is to prevent a signal at 52 as the result of noise. As will be seen, it is feasible to have attenuation in either channel, but the channel with the clipper means will always be considered the control or reference channel. The distinction is made because when a differential comparator is used as the threshold means, it is not obvious which is the control and which is the measured signal.

It should likewise be obvious from the discussion, that the larger signal may be produced to occur in either channel, and that either may be positive or negative going.

FIGS. 4 and 6 also relate to single threshold circuits, since the output pulses will represent all input pairs of pulses in which the amplitude of one exceeds the amplitude of another by a given factor. In FIG. 8 there is illustrated a circuit 100 in which there are two thresholds.

In FIG. 8 the apparatus 100 produces an output signal in a manner to be described in connection with the charts of FIG. 9 only in the case that the ratio between the amplitudes of the input pulses at 26 and 28 falls between two values. These values are the attenuations of the two attenuators 36 and 136. The operation is similar to that of the apparatus 20 of FIG. 4 except that there are two attenuators 36 and 136 and two threshold circuits 40 and 140, and in addition there is logic circuitry to provide a decision as to what pulses are to be counted.

The logic circuit 102 is connected to the outputs 52 and 152 from the threshold circuits 40 and 140 respectively, and it is a VETO/AND circuit. This is in the form of an AND circuit with one input inverted so that when a pulse appears at 52 in the absence of a pulse at 152 there will be an output pulse. If a pulse appears at the line 152 there will be no output pulse irrespective of whether there is a pulse on the input 52. For clarity, the pulse in the path 52 will be referred to as a count pulse, while the pulse in the path 152 will be referred to as a veto pulse. The presence of a veto pulse will always prevent an output, but the presence of a count pulse will produce an output only when there is no veto pulse.

By means of this VETO/AND circuit, pulses which appear at the line 28 which is the B channel, produce an output from the threshold circuit 40 at 52 if they exceed a predetermined fraction of the respective companion pulses appearing at the line 26 as determined by attenuator 36 and threshold 40. The clipper 46, attenuator 36 and the threshold circuit 40 operate here in the same manner as described in connection with FIG. 4, but with certain exceptions.

Instead of being in the channel 28 as in the case of FIG. 4, the variable threshold producing means 40 and 140 are in the channel 26 with the clipper means 46. In this case, therefore, the A pulse is attenuated and may be considered the reference signal but it also is used to establish the threshold on the basis of which the pulse will be accepted or discarded. The measured signal is the B pulse, although it is used without change. Obviously there could be some form of attenuating means in the channel 28, if desired, but in view of the use of the attenuator means 36 and 136 in connection with the window-establishing thresholds, this is not necessary.

Continuing with the discussion of the VETO/AND circuit 102, if the pulse appearing at the line 28 is also greater than a predetermined fraction of the pulse appearing at the line 26 as determined by attenuator 136 and threshold circuit 140, there will also be an output at 152 leading to the VETO/AND circuit 102 and under these circumstances there will be no output from the VETO/AND circuit 102 passed by the line 104 to the counter means 54. To obtain an output signal, obviously the signal at 28 must be less than the predetermined fraction of pulse appearing at line 26 determined by the second set of attenuator and threshold circuits 136 and 140. Accordingly, this establishes upper and lower limits between which amplitudes a signal must fall in order eventually to be counted.

As in the case of the previously described structures, the influence of noise should be considered in constructing the apparatus. This could be solved as suggested previously by making the threshold circuits have hysteresis.

Another problem which gives rise to spurious output pulses is based on the fact that the two threshold crossings may not occur simultaneously. Imperfect simultaneity permits very short pulses to pass through the VETO/AND circuit between the time a pulse has crossed the lower threshold and before it crosses the upper threshold on the leading edge and again in reverse order on the trailing edge. This is due to the fact that the veto pulse, being produced by a higher level on the signal pulse at path 26, has slightly shorter duration and consequently cannot prevent an output at path 104 for the full duration of the count pulse.

There are several ways to correct the above imperfection, but these need not be explained in great detail. One way would be to place a low-pass filter 170 in the output from the VETO/AND logic circuit 102. Since the useful pulses normally would be of long duration relative to the erroneous ones caused by lack of simultaneity, this low pass filter would pass only the desired pulses of relatively long duration, and the others would build up and subside faster than the output of the filter would be able to change. Another method for correcting for this lack of simultaneity is described in U.S. Patent 3,259,842 in which a flip-flop is cocked the first time the signal voltage crosses the upper or veto threshold, generating a secondary veto pulse which exists until after a secondary count pulse is generated at which time both the count pulse and the veto pulse are terminated simultaneously and without regard to the slope of the trailing edge of the signal pulse. Apparatus described below solve these as well as other problems in still other ways.

Referring now to the charts FIGS. 9a to 9f, in FIGS. 9a and 9b respectively there are illustrated three pairs of pulses, 200, 202, 204, 206, 208 and 210. The pulses are paired time-wise as 200 and 202 occurring between time t1 and t2; 204 and 206 occurring between time t3 and t4; and 208 and 210 occurring between time t5 and t6. The pulses 200, 204 and 208 occur on the A channel as a result of three respective particles passing through the sensing zone means and producing what may be termed large, small and medium signals. The signals 202, 206 and 210 are all practically the same size, these appearing on the B channel and also as a result of the same three particles. Again the A channel pulses may be assumed to be attributed to a direct current source and the B channel pulses to a radio frequency current source. The pulses of FIGS. 9a and 9b are shown in FIG. 9c for comparison purposes, together with pulses produced as a result of attenuation of the A channel pulses. B channel pulses may be considered reference pulses.

In the case of the large pulse 200, the attenuators 36 and 136 are adjusted to decrease these pulses 50% and 40%, resulting in pulses 200' and 200" appearing at 162 and 160, respectively. These pulses may be considered the control or measuring pulses, attenuated by some factor established in the attenuator means. The respective thresholds in the circuits 140 and 40 will be the same in the apparatus 100, but suitable adjustments of one relative to the other may also be made by attenuating means in one or the other or both of the lines 164 and 166. The inputs to these thresholds will be the pulses 202, 206 or 210 as the respective pulses occur.

The pulse 204 will be attenuated to pulses 204' and 204" while the pulse 208 will be attenuated to pulses 208' and 208". It will be noted that due to the use of the anti-noise clipper means 46 the signals on channel A will be prevented from falling to their normal baseline 220, establishing the artificial elevated baseline 221. After attenuation, the corresponding artificial baselines are at 222 and 223. The channel B baseline is 220 and the pulses on channel B retain this baseline 220. Accordingly the critical crossings of pulses relative to thresholds will be at t3', t4', t5' and t6', representing smaller elapsed times, as seen.

Considering now the three sets of pulses, the pulse 202 exceeds neither pulse 200' nor pulse 200"; the pulse 206 exceeds both pulses 204' and 204"; and pulse 210 exceeds pulse 208" but not 208'. Examining the circuit of FIG. 8, if the amplitude of the pulse at 164 exceeds that of the pulse established by threshold 140 there will be a veto pulse at 152, but if not there will be no pulse at 152. Thus, there will be no pulse in the case of pulse 202; there will be one for the pulse 206; there will be none for the pulse 210. FIG. 9d showing the output 152 from the threshold 140 shows only a veto pulse 224 as a result of the pulse 206 on the channel A. The thresholds 200' and 208' of the largest pulse 200 and the medium sized pulse 208, respectively, were not crossed by their comparion pulses 202 and 210.

As for the outputs at 52, these are shown in FIG. 9e at 226 and 227. The reason for such pulses is that in each case, the threshold established by the threshold circuit 40 was exceeded by the measured pulse. Thus, the measured pulse 202 did not exceed the threshold 200" and hence there is no signal at 52 for the pulse 200; the measured pulse 206 did exceed the threshold 204" and the signal 226 appears at 52; and the measured pulse 210 did exceed the threshold 208" and a signal 227 appears at 52.

The signals at 52 are count signals and those at 152 are veto signals. Considering the particle producing pulse pair 200 and 202, there is no veto signal for it at 152, but neither is there a count signal at 52 and hence there will be no output from the VETO/AND circuit 102. Consider the pulse pair 204 and 206, there is a veto signal 224 and also a count signal 226, but due to the nature of the VETO/AND circuit 102, there will not be an output for this pulse pair either. As for the medium pulse pair, 208 and 210, since there is no veto signal, and there is a count signal 227, this alone will provide an output signal 228 at 104.

In the manner described, it will be seen that the apparatus 100 of FIG. 8 is constructed to provide a pair of thresholds establishing upper and lower quotients between which the division of one signal by the other must fall in order for the collating means to provide an output. The counter means 54 will therefore give a read-out in some form which represents the number of pulses at the input lines 26 and 28 which met the requirements of the circuit.

In the collating apparatus 230 illustrated in FIG. 10 and in other apparatus described hereinafter, the need for the clipper means or other structure to obviate noise problems is eliminated in favor of so-called pulse stretchers. In FIG. 10, the A and B pulses appearing at the lines 26 and 28 respectively are applied to the pulse stretchers 240 and 242 respectively. The principal characteristic of a pulse stretcher is that its output follows its input so long as the slope of the input has one polarity, but does not change when the polarity changes. Thus, an input pulse is followed to its peak, retains the peak amplitude after the peak has been reached, and does not drop until a suitable command signal is provided. (See Nuclear Pulse Spectrometry, by Robert L. Chase, McGraw-Hill, 1961 for several examples.)

It can thus be said of the pulse stretchers 240 and 242 that they "remember" the peak signal values after the electrical pulses applied to their respective inputs subside.

The command signal in the case of collating means 230 is provided by a readout pulse generator 254, by way of the path 246. The pulse stretchers 240 and 242 store the instantaneous voltage existing a fraction of a microsecond after the application of the readout command pulse at 246 until the application of a reset pulse on the path 248, at which time the now re-shaped signals at 264 and 266 return to zero.

In this manner, the original electrical pulses are changed into substantially rectangular pulses which have their respective original amplitudes, but precise leading and trailing edges.

The timing pulse generator 250 may be any kind of trigger circuit arranged to produce a timing pulse or pip at a pre-determined time during the electrical pulse appearing at 28 and 26. It is presumed that the pulse on 28 occurs simultaneously with the pulse at 26. This time could be the instant that the electrical pulse at 28 reaches its maximum amplitude or when its rate of change is zero.

In the apparatus of FIG. 10, the trigger pulse at 252 applied to the generator 254 produces a rectangular "hold" pulse of convenient amplitude and duration for application to the two pulse stretchers 240 and 242. The generator 254 could be a common one-shot multivibrator or univibrator adjusted to generate a pulse 5 to 10 microseconds in duration for example, and of sufficient amplitude to cause the desired reaction of the pulse stretchers.

The instant the leading edge of the "hold" pulse at 246 is applied to the pulse stretchers 240 and 242, the pulse stretchers cease to follow their input voltages at 26 and 28, respectively, and maintain the value of the signal at that instant for the duration of the hold pulse. At the end of the hold pulse, the trailing edge detector 256 triggers the reset pulse generator 260 via path 258, which may be another one-shot multivibrator like 254, but emitting perhaps a shorter duration pulse. This pulse need only be long enough to insure that the capacitors of the pulse stretchers are sufficiently well discharged that the following pulse may be processed accurately.

In the manner described, pulses are generated on the paths 264 and 266 which have substantially the same duration as the readout pulses from the generator 254 and amplitudes proportional respectively to the electrical pulses appearing at 28 and 26. These pulses represent more accurate measurement of the particles than afforded by the structures previously described herein, have no noise, and equal durations.

In FIGS. 11a to 11i, the various wave shapes in the collating apparatus 230 are depicted on the same time axes. In FIGS. 11a and 11b there are illustrated pairs of companion pulses commonly produced. The large pulse 270 and its companion pulse 271 occur on the lines 26 and 28, respectively, caused by the same particle passing relative to a sensing zone or zones. The pulses 270 and 271 occur commencing at the time $t1$, but their duration is of little consequence and is not designated in these charts. The next pair of companion pulses is designated 272 and 273, these commencing at the time $t5$. These pulses are repeated in other charts for comparison purposes. The pulse 270 is again shown in broken lines in FIG. 11g, the pulse 271 in broken lines in FIG. 11h, the pulse 272 in broken lines in FIG. 11g, and the pulse 273 in broken lines in FIG. 11h.

As seen in FIG. 10, the A channel pulse is attenuated by the attenuator means 36 to perform the operation of division, so that at 265 the amplitudes are decreased. Accordingly, the pulses which appear on the connection 265 are the pulses 290 and 292, corresponding to pulses 270 and 272, respectively. Since the attenuator means 36 follows the pulse stretcher 240, it handles only the rectangular pulse output of the pulse stretcher, decreasing the amplitude of the same by some factor. These pulses are passed through the threshold circuit 40 which provides an output if the proper conditions are met.

Considering first the larger pulse 270 and its companion pulse 271, the timing pulse 274 occurs at 252 at the approximate center of the pulses 270 and 271. This trigger pulse 274 initiates a square wave 276 from the readout pulse generator, whose duration is controlled and occurs between time $t2$ and time $t3$. At the trailing edge at time $t3$, the trigger pulse 278 is generated in the detector 256 and applied to the reset pulse generator 260 to produce a square wave output 280 occurring from time $t3$ to $t4$.

In the meantime, the pulse stretchers 240 and 242 produce signals whose flat tops are equal to the respective amplitudes causing the same. The flat top 282 is equal to the pulse 270 at the time $t2$ and the flat top 284 is equal to the pulse 271 at the time $t2$. The readout pulse 276 causes only the rectangular waves shown at 288 and 289 to pass to the lines 266 and 264 respectively. The rectangular pulse 288 is applied to the attenuator means 36 and appears at 265 in a reduced amplitude form, shown in broken lines at 290 in FIGS. 11g and 11h, for comparison. This pulse is here used for setting the level of the threshold circuit 40, and hence since the square wave 284 passes directly to the threshold circuit 40 and does not exceed the pulse 290, there is no output at 52 caused by the division of the pulses 270 and 271.

The same logic follows in the case of pulses 272 and 273. In this case, the square wave pulse 292 provides a lower threshold for the pulse 294 and hence there will be an output 296 appearing at 52. This passes to the counter means 54.

Figure 12:
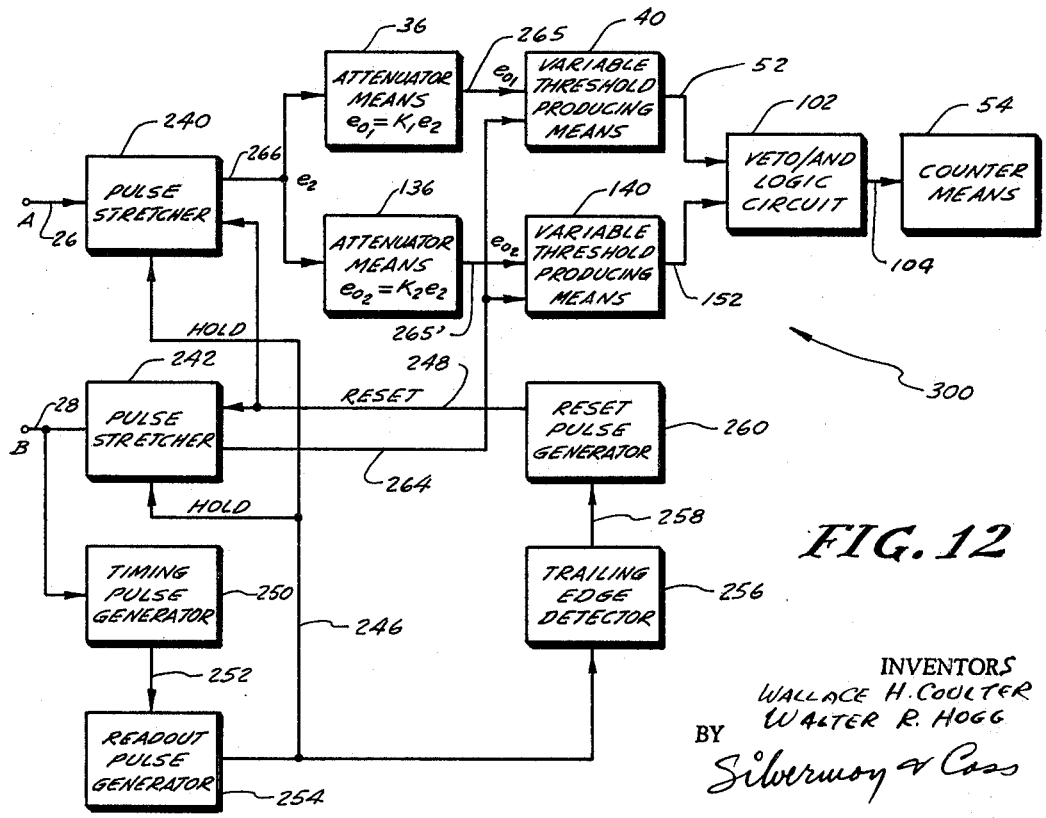
FIG. 12 is a block diagram of a "two threshold" apparatus of modified form, constructed in accordance with the invention.

The collating apparatus 230 of FIG. 10 is a single threshold device of the general type described in FIGS. 4 and 6 but of better reliability and accuracy, since it is much less affected by noise and particle trajectory. Similarly two-threshold circuits may be constructed by some duplication of components, much as the modified form described in connection with FIG. 8 above. Thus, in FIG. 12, a collating apparatus 300 is illustrated which utilizes a two-threshold circuit operating on the principles of the structures of FIGS. 8 and 10 combined. The difference between this structure and that of FIG. 10 is that instead of providing a single attenuator means and threshold circuit, two each are provided. The two attenuators 136 and 36' have different attenuation factors $k1$ and $k2$ so that the electrical pulse at 266, which is $e2$ the output from the pulse stretcher 240, will be modified to provide different amplitudes $eo1$ and $eo2$ at 265 and 265'. Each of these signals provides a different threshold at 40 and 140 to establish the "window" explained in connection with FIG. 8. The outputs from the threshold circuits appear at 52 and 152 and are applied to a VETO/AND logic circuit that operates like that of FIG. 8.

In all other respects the collating apparatus 300 is similar to structure described, and its operation should be obvious. FIG. 13 illustrates the wave shapes for three different pairs of electrical pulses derived from common particles passing relative to a Coulter type sensing zone or zones. The input pulses 301, 303 and 305 are large, small and medium electrical pulses at the line 26, and the input pulses 302, 304 and 306 are assumed to be about the same size on the line 28. The pulse stretcher 240 produces flat top signals 311, 315 and 321, respectively, due to the action of the trigger pulse 307 and the readout pulse 308. In the same manner, the electrical input pulses on line 28 produce the flat top pulses 314, 318 and 324. After attenuation, the large pulse 301 provides the two threshold control pulses 312 and 313; the small pulse 303 provides the two threshold control pulses 316 and 317; and the medium size pulse 305 provides the two threshold control pulses 322 and 323. These threshold control pulses represent the attenuation factor operating upon the input pulse for each of the channels 265 and 265' since the original upper pulse was divided into two separate paths in order to establish the window between which the pulse at B must fall in order to be counted.

Assuming further that the line 52 is count, and the line 152 is veto, in the case of the large pulse 301, the flat top pulse 314 never exceeds either of the threshold pulses 312 and 313, so that there is not output at either 52 and 152 and certainly none at 104. In the case of the small pulse 303, the flat top pulse 318 exceeds both threshold pulses 316 and 317, so that there will be signals at both 52 and 152. These signals are shown in FIG. 13*i* and FIG. 13*j* at 319 and 320 respectively. Since the pulse 319 is a veto pulse, there will be no output at 104, and none is shown in FIG. 13*k*. Finally, the medium size signal 305 produces threshold levels 322 and 323 which are greater and less than the signal 324, respectively, so that there is no veto pulse at 152 but there is a count pulse 325 at 52. As a result there will be an output pulse 326 at 104 which passes to the counting means.

Figure 14:
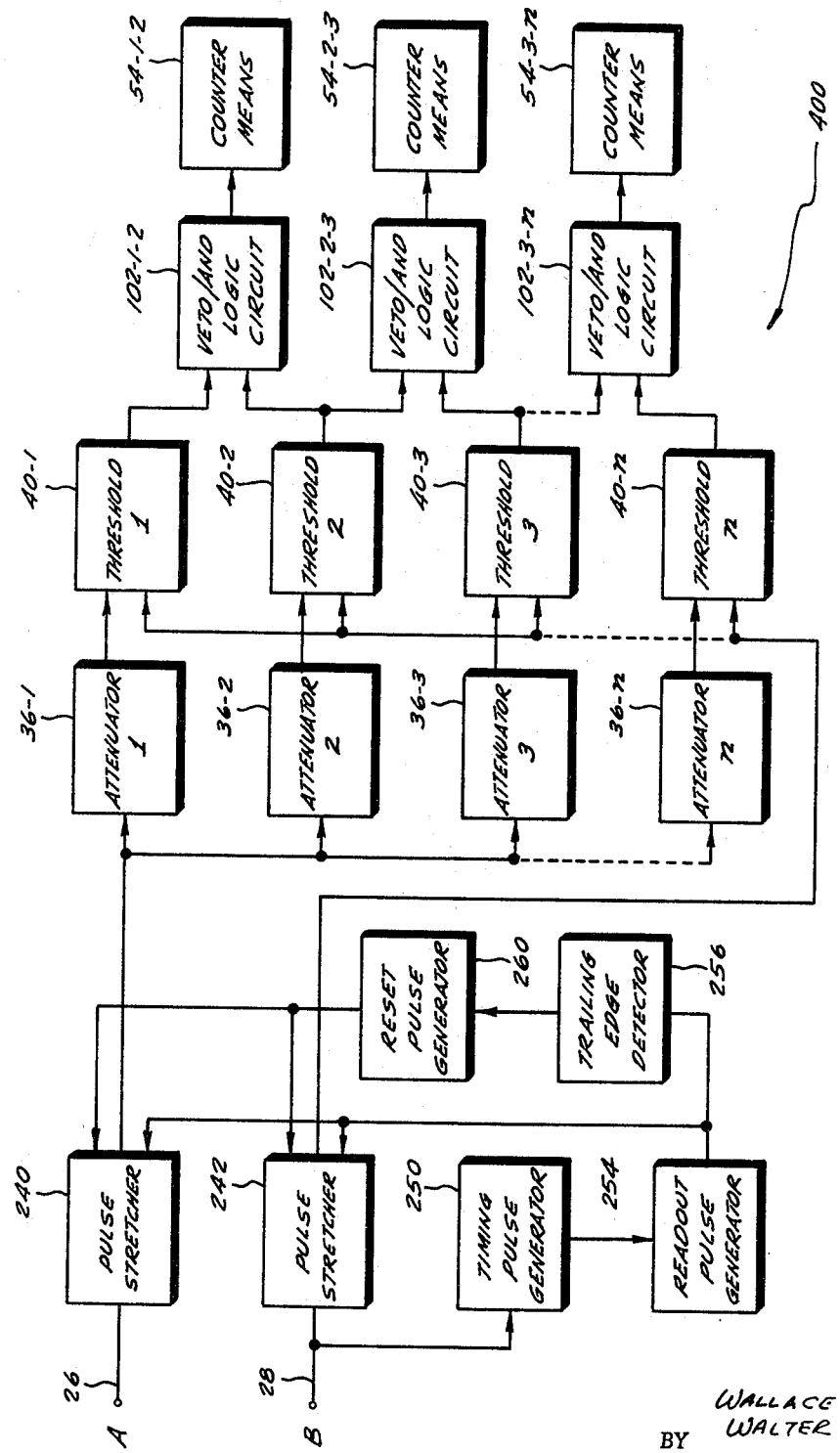
FIG. 14 is a block diagram of a multiple range apparatus constructed in accordance with the invention.

In FIG. 14, the various attenuator means, threshold establishing circuits and logic circuits are used repeatedly to make up a collating apparatus 400 which utilizes a plurality of windows, each of which passes a pulse representing a pair occurring within a given range. This is a structure which enables obtaining information of a distribution of amplitude ratios. The reference numerals are similar to those used in prior structures described, and the operation should be readily understood.

It will be obvious that the invention is capable of embodiment in a wide variety of apparatus, using circuits and components of different types in many different ways, but without leaving the framework of the invention as presented.

What it is desired to secure by Letters Patent of the United States is:

1. Apparatus for studying particles suspended in a fluid medium having at least one electrical property different than that of the substance or substances of said particles, comprising:
    particle scanning means having at least one sensing zone energized by electric current source means, said sensing zone being responsive to the movement of said particles for causing said scanning means to provide first and second companion electrical signals representing different physical characteristics of each individually scanned particle and having correspondingly different amplitudes;
    means for detecting said electrical companion signals and including at least two channels;
    a first of said channels having means to derive from said first electrical signals a first train of pulses having amplitudes which are a primary function of one common physical characteristic of the particles;
    a second of said channels having means to derive from said second electrical signals a second train of pulses as companion pulses, respectively, of the first pulses in the first channel, but having amplitudes which are a primary function of physical characteristics of the same particles different from said common one; and
    collating circuit means connected with said channels to collate said companion pulses pair-by-pair seriatim and provide a train of output signals, each output signal representative of the amplitude relationship between a particular companion pair, for receipt by readout means for purposes of studying the different physical characteristics of the particles.

2. Apparatus as claimed in claim 1 in which said collating means include
    an inverse function responding amplifier connected to receive at separate inputs each of said pulse trains from said channels and to generate an output train of signals each proportional to the division of the amplitude of one of said companion pulses by the other.

3. Apparatus as claimed in claim 1 in which said collating means include
    predetermined factor comparison means to compare the companion pulses against each other and obtain an output signal in the event one pulse exceeds the other by a predetermined factor.

4. Apparatus as claimed in claim 3 in which said comparison means include
    means which provide a pair of different predetermined factors, said output signal occurring in the event the pulse amplitude of said one pulse is within a range defined by said pair of factors.

5. Apparatus as claimed in claim 1 in which said collating circuit means include
    at least one variable threshold producing means coupled to receive at separate inputs a respective different one of said pulse trains from said channels,
    said variable threshold means is internally connected to be controlled by the amplitude of one of each of said companion pulses to establish a control threshold for each such pair, and
    said variable threshold means produces one of said output signals only when the other pulse of each such pair exceeds said control threshold.

6. Apparatus as claimed in claim 5 in which said collating circuit means further include
    pulse attenuating means connected to at least one of said separate inputs for adjusting the relative amplitudes of said trains of pulses.

7. Apparatus as claimed in claim 5 in which said collating circuit means include
    pulse stretcher circuitry connected to separately receive each of said pulse trains and transduce the pulses therein into rectangular pulses all of equal duration and each having an amplitude proportional to the amplitude of the specifically transduced pulse.

8. Apparatus as claimed in claim 5 in which said collating circuit means include
    pulse clipping means connected to said variable threshold producing means so as to receive and operate upon one of said trains of pulses prior to receipt by said variable threshold producing means.

9. Apparatus as claimed in claim 5 in which said collating circuit means include
    a pair of said variable threshold producing means for establishing a pair of said control thresholds which are mutually controlled by said one companion pulse, and
    a pulse veto circuit arranged to block pulses occurring above and below said control thresholds and to provide an electronic window having an output only upon occurrence of pulses whose amplitudes lie in said window.

10. Apparatus as claimed in claim 1 in which said particle scanning means include
    two sensing zones arranged such that each particle will move relative to both sensing zones consecutively, the companion signals produced by each particle thus being separated timewise, and
    means are provided to delay the first occurring of said companion signals by a time sufficient to cause each companion pair to be received by said collating circuit means substantially simultaneously.

References Cited

UNITED STATES PATENTS

| | | | |
|---|---|---|---|
| 2,847,162 | 8/1958 | Meyer | 88—14 XR |
| 2,873,644 | 2/1959 | Kremen et al. | 88—14 |
| 3,114,257 | 12/1963 | Foster et al. | 324—61 XR |
| 3,155,902 | 11/1964 | Walls | 324—61 |

EDWARD E. KUBASIEWICZ, Primary Examiner

U.S. CL. X.R.

235—92